E. CARRAU.
TIRE.
APPLICATION FILED APR. 24, 1918.
1,336,817.
Patented Apr. 13, 1920.
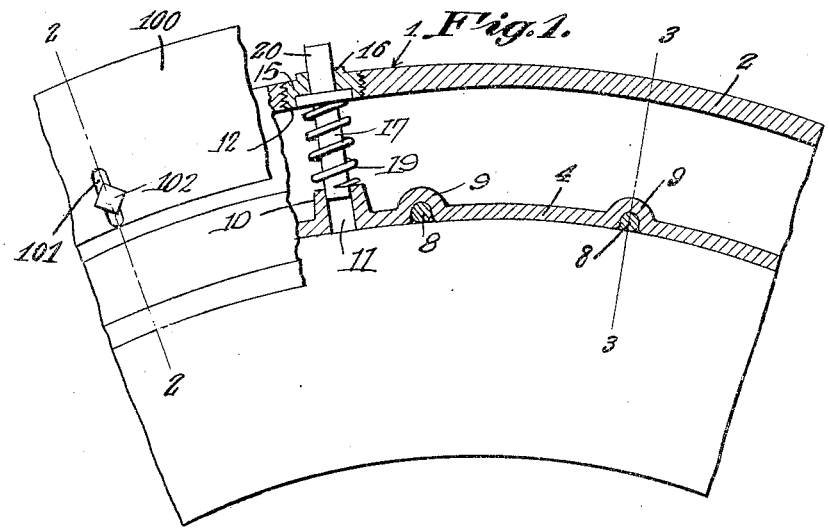
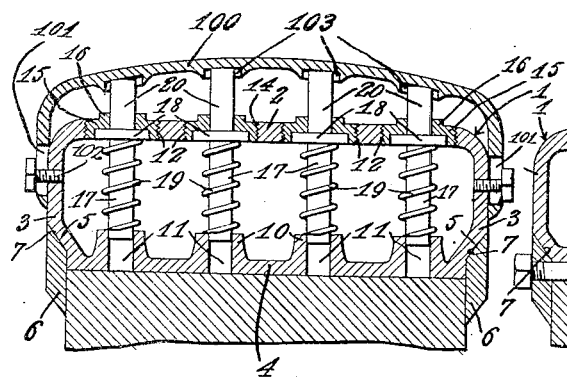
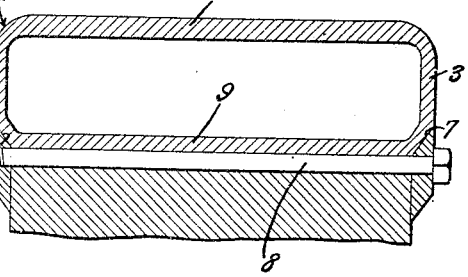
E. Carrau, Inventor
Witness
By C. A. Snow & Co.
Attorneys

UNITED STATES PATENT OFFICE.

EDWARD CARRAU, OF CHICAGO, ILLINOIS, ASSIGNOR OF ONE-HALF TO WILLIAM F. WALBACH, OF CHICAGO, ILLINOIS.

TIRE.

1,336,817.　　　Specification of Letters Patent.　　Patented Apr. 13, 1920.

Application filed April 24, 1918. Serial No. 230,476.

*To all whom it may concern:*

Be it known that I, EDWARD CARRAU, a citizen of the United States, residing at Chicago, in the county of Cook and State of Illinois, have invented a new and useful Tire, of which the following is a specification.

The device forming the subject matter of this application is a tire, and the invention aims to provide novel means whereby the tire will be prevented from skidding, without, however, giving the tire an unusually rough surface.

It is within the province of the disclosure to improve generally and to enhance the utility of devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a fragmental side elevation, parts being in section;

Fig. 2 is a cross section on the line 2—2 of Fig. 1; and

Fig. 3 is a cross section on the line 3—3 of Fig. 1.

The numeral 1 denotes a tire preferably made of metal and including a tread 2, sides 3 and a base 4. The tire is shown in cross section as being oblong, but, of course, the tire may be of any desired shape, without jeopardizing the utility of the invention. The sides 3 of the tire include parts 5 coöperating with the beveled portions 7 of retaining rings 6 held on the tire by means of bolts 8 received in transverse seats 9 fashioned in the base 4, the rings 6 and the bolts 8 constitute means whereby the tire may be held on a wheel rim. The base 4 of the tire 1 is provided with bosses 10 having openings 11. There are openings 12 in the tread 2 in radial alinement with the openings 11. Cup-shaped caps 14 are threaded into the openings 12 and include outer end walls 15 having necks 16. Plungers 17, in the form of rigid rods slide in the necks 16 and in the openings 11 of the bosses 10. The plungers 17 have enlarged heads 18 received within the caps 14 and abutting against the end walls 15 of the caps to limit the outward movement of the plungers under the action of compression springs 19 which, surrounding the plungers 17 within the tire 1, abut at their outer ends against the heads 18, and abut at their inner ends against the bosses 10. When the plungers 17 are forced outwardly by the springs 19, the exposed extremities 20 of the plungers form traction cleats, adapted to prevent skidding. The springs 19 are strong and advance the plungers 17 sufficiently so that the ends 20 thereof will conform to inequalities in the ground and limit side skidding without, however, presenting an unduly rough and broken tread. The plungers 17 preferably are arranged in planes extended transversely of the tire 1. There may be any desired number of sets of plungers, spaced circumferentially of the tire 1 to such an extent as the taste of the manufacturer or the exigencies of the proposed use may demand.

In assembling the device, the springs 19 may be placed around the inner ends of the plungers 17, the outer ends of the plungers being pressed through the necks 16 of the caps 14. The caps 14 may thereupon be threaded into the openings 12 of the tread 2, thereby compressing the springs.

The tire 1 may be inclosed in a trough-shaped casing 100 which, if desired, may be made in sections, so that it can be placed about the tire. The casing is supplied in its sides with slots 101 through which pass securing devices 102, the securing devices being mounted in the side of the tire 1. The casing 100 is provided with sockets 103 wherein the plungers 17 are received, the casing being supported by the plungers, and the slots 101 being of sufficient size, compared with the securing devices 102, to permit the necessary movement of the casing with respect to the tire. If it is desired to use the plungers 17 to prevent skidding, the casing 100 is removed, but if the device is used, under such conditions as make it necessary to provide against skidding, then the casing may be mounted in place as above described.

It is to be observed that the caps 14 may be adjusted in the tread 2, so as to permit an adjustment of the outer ends of the plungers 17 with respect to the casing 100. The casing 100 preferably is made of metal and is rigid. In operation, the casing has an eccentric movement with respect to the wheel and does not yield locally.

Having thus described the invention what is claimed is:—

In a device of the class described, a hollow member comprising a tread, a base and sides uniting the tread and the base; a trough-shaped casing inverted on said member and including sides coacting with the sides of said member; means for connecting the sides of the casing with the sides of said member for limited movement; plungers slidable in the base and bearing at their outer ends against the casing; heads on the plungers; compression springs abutting against the base and against the heads, the springs surrounding portions of the plungers; and caps receiving the plungers slidably and constituting abutments for the heads, the caps being threaded into the tread to permit an adjustment of the outer ends of the plungers with respect to the casing.

In testimony that I claim the foregoing as my own, I have hereto affixed my signature in the presence of two witnesses.

EDWARD CARRAU.

Witnesses:
M. C. SHANNON,
J. C. FICKLIN.